United States Patent Office 3,291,579
Patented Dec. 13, 1966

3,291,579
PROCESS FOR GELLING ALCOHOLS
Bernard F. Mulaskey, Point Richmond, Calif., assignor to Chevron Research Company, a corporation of Delaware
No Drawing. Filed June 6, 1963, Ser. No. 285,894
5 Claims. (Cl. 44—7)

This invention relates to a process for gelling lower alcohols.

Gelled alcohols have been commercially marketed for use as portable canned heat, i.e., the solid alcohol gels can be tinned, and burned by merely opening the can and igniting. In the past, a number of alcohol gelling agents have been suggested and employed. For example, nitrostarch, stearic acid, sodium stearate, colloidion, or combinations of these, have been all disclosed as gelling agents.

I have now found still another method of gelling alcohols that has a number of advantages, particularly for use as a canned fuel.

According to the present process, an alcohol-containing alcogel is produced by forming a solution of a metal halide and a lower alcohol and reacting the solution in the presence of water with a quantity of an epoxy compound sufficient to convert the entire resulting mixture to the alcogel.

It has been found that the solid alcohol fuel alcogel produced by the subject process possesses the following desirable attributes. The fuel is very firm even with a low solids content. It does not melt or become plastic during burning or at high ambient temperatures and, thus, need not be enclosed within a container while burning. Further, the ash formed on burning has a high surface area and acts as a wick to keep the fuel burning evenly.

Suitable alcohols or mixtures thereof, that can be gelled by the subject process are those herein termed the lower alcohols, specifically those having from 1 to 4 carbon atoms per molecule. Preferably, the alcohol employed is methanol or ethanol, or mixtures of the two. If desired, other mixed solvents can be employed so long as sufficient metal halide can be dissolved with the formation of a homogeneous solution.

A wide variety of metal halides are suitable for use in aiding the formation of an alcogel. The main requirement is that they be soluble in the solvent, and, of course, be nonexplosive if a canned fuel is desired. Among the metals that can be employed are germanium, vanadium, niobium, tantalium and thorium, but preferably, aluminum, titanium, zirconium, chromium and iron. The particular halides that are suitable are the chlorides, bromides and iodides. Fluorides are not suitable since they are insoluble in alcohol.

The solution comprising the metal halide, and alcohol is reacted in the presence of water with a quantity of an epoxy compound. It is important that a homogeneous mixture of the epoxide and the metal halide and alcohol be formed before the components set into an alcogel. The necessary water may be provided by using a hydrated form of the metal halide, or by introducing the water into the system in uncombined form, or both.

Preferred epoxides suitable for use in the present process are oxiranes containing from 2 to 3 carbon atoms per molecule and include ethylene oxide, propylene oxide, and epichlorohydrin. The amount of epoxide reacted can be expressed in the mol ratio of the epoxy compound to the mols of halide ions present. This ratio should be from about 0.5 to 7.0 or more, and preferably from about 1.0 to 5.0.

Following the addition of the epoxy compound, the resulting mixture will set into the desired alcogel after a period of from a few seconds to several hours, depending upon the concentration of the components, the temperature, and the particular alcohol or combination of solvents employed. The resulting alcogel is then suitable for use as a canned fuel. The alcohol and the halohydrin produced in the reaction will burn quite readily. The alcogel can be readily formed within the container it is to be transported in. The following examples show a number of suitable applications of the present invention.

EXAMPLE 1

2411 grams of $AlCl_3 \cdot 6H_2O$ were dissolved in 23 liters of methyl alcohol. To this solution was added 7 liters of propylene oxide at room temperature. After about 10 minutes, the alcohol gelled to a clear alcogel. A 4 ounce sample of this alcogel was inserted in a can and ignited with a match. The alcogel burned with a hot, faintly blue flame. The burning alcogel was then used to heat 800 ml. of water. The temperature increase of this water, with respect to time, is shown in Table 1.

Table 1

| Time, mins.: | Water temp., ° C. |
|---|---|
| 0 | 23 |
| 3 | 35 |
| 5.7 | 46 |
| 9 | 58 |
| 10 | 63 |
| 15 | 77 |
| 16 | 80 |
| 18 | 84 |
| 23 | 90 |
| 27 | 95 |

EXAMPLE 2

270 grams of $FeCl_3 \cdot 6H_2O$ were dissolved in 2000 ml. of methyl alcohol. With the solution at room temperature, 700 ml. of propylene oxide were added thereto, the reaction increasing the solution temperature to 61° C. After 2.5 minutes, an alcogel was formed.

EXAMPLE 3

An alcogel was formed by adding 500 ml. of propylene oxide to a solution of 135.3 grams of $NbCl_5$, one liter of methyl alcohol, and 36 ml. of water.

EXAMPLE 4

An alcogel was produced by adding 552 ml. of propylene oxide to a solution consisting of 350.3 grams of $CrCl_3 \cdot 6H_2O$ dissolved in 1430 ml. of a 10 percent water in methanol admixture.

EXAMPLE 5

An alcogel was formed by adding 200 ml. of propylene oxide to a solution composed of 161 grams of $ZrOCl_2 \cdot H_2O$ dissolved in 700 ml. of methyl alcohol.

EXAMPLE 6

An alcogel was produced by adding 38.8 ml. of propylene oxide (at room temperature) to a solution composed of 25 grams of $FeCl_3 \cdot 6H_2O$ dissolved in 205 ml. of n-propyl alcohol. Accompanied by a temperature rise to 63° C., the alcogel formed after 4 minutes.

EXAMPLE 7

125 grams of a 20 percent solution of $TiCl_3$ in water were dissolved in 297 ml. of n-propyl alcohol. With the solution at room temperature, 68.1 ml. of propylene oxide were added thereto, the reaction increasing the solution temperature to 55° C. After one minute, the alcohol gelled to form the alcogel. The initial alcogel was purple in color, but, upon long exposure to air, turned white.

All of the alcogels shown in the above examples were easily ignited and burned with a faintly blue flame. If desired, small amounts of hydrocarbons can be added to the initial solution which will cause the resulting alcogel to burn with a visible yellow flame.

Although only specific components and uses of the present invention have been described and exemplified, numerous variations in compositions and uses of the subject gelling method could be made without departing from the spirit of the invention, and all such variations that fall within the scope of the appended claims are intended to be embraced thereby.

I claim:

1. A process for producing an alcohol-containing alcogel which can be ignited in air under ambient conditions, which comprises:
    (a) forming a solution comprising a metal halide, a lower alcohol and water; and
    (b) adding to said solution an oxirane containing 2 or 3 carbon atoms per molecule, said oxirane being added in an amount of at least 0.5 mol per mol of said metal halide, said addition of said oxirane to said solution causing the entire resulting mixture to set up into the desired gel.

2. A process as in claim 1, wherein said solution is formed by combining a lower alcohol with a hydrated form of said metal halide.

3. A process as in claim 2, wherein said solution is formed by combining said metal halide in an anhydrous form with alcohol and water.

4. A process as in claim 2, wherein said solution contains from about 3 to about 10 weight percent of said metal halide.

5. In a process wherein a metal halide is reacted with an epoxide by adding said epoxide to a solution of said halide and an alcohol solvent, the improvement which comprises:
    (a) using a lower alcohol as said solvent;
    (b) using as said epoxide an oxirane containing 2 or 3 carbon atoms per molecule, in an amount of at least 0.5 mol per mol of said metal halide; and
    (c) accomplishing said epoxide addition to said solution in the presence of water, whereby said epoxide addition causes all components of the resulting mixture to set up into a gel.

References Cited by the Examiner
UNITED STATES PATENTS

| | | | |
|---|---|---|---|
| 2,700,048 | 1/1955 | Schmidt | 260—448 X |
| 2,828,265 | 3/1958 | Van Strien | 44—7 |

DANIEL E. WYMAN, *Primary Examiner.*

C. F. DEES, *Assistant Examiner.*

UNITED STATES PATENT OFFICE
CERTIFICATE OF CORRECTION

Patent No. 3,291,579　　　　　　　　　　　　December 13, 1966

Bernard F. Mulaskey

It is hereby certified that error appears in the above numbered patent requiring correction and that the said Letters Patent should read as corrected below.

Column 4, lines 1 and 4, for the claim reference numeral "2", each occurrence, read -- 1 --.

Signed and sealed this 26th day of September 1967.

(SEAL)
Attest:

ERNEST W. SWIDER　　　　　　　　　　　　EDWARD J. BRENNER
Attesting Officer　　　　　　　　　　　　Commissioner of Patents